(12) United States Patent
Takagi (10) Patent No.: US 8,655,533 B2
(45) Date of Patent: Feb. 18, 2014

(54) ELECTRIC VEHICLE

(75) Inventor: Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 41 days.

(21) Appl. No.: 13/340,514

(22) Filed: Dec. 29, 2011

(65) Prior Publication Data
US 2013/0173099 A1  Jul. 4, 2013

(51) Int. Cl.
*B60W 10/18* (2012.01)
*B60W 20/00* (2006.01)

(52) U.S. Cl.
USPC ................. 701/22; 180/65.265; 303/152

(58) Field of Classification Search
None
See application file for complete search history.

(56) References Cited

U.S. PATENT DOCUMENTS

| | | | |
|---|---|---|---|
| 2004/0238244 A1* | 12/2004 | Amanuma et al. | 180/65.2 |
| 2006/0055240 A1* | 3/2006 | Toyota et al. | 303/152 |
| 2006/0196712 A1* | 9/2006 | Toyota et al. | 180/165 |
| 2008/0312029 A1* | 12/2008 | Matsubara et al. | 477/3 |
| 2009/0203481 A1* | 8/2009 | Nohara et al. | 475/150 |

FOREIGN PATENT DOCUMENTS

JP  05-191904  7/1993

* cited by examiner

*Primary Examiner* — Behrang Badii
*Assistant Examiner* — Demetra Smith-Stewart
(74) *Attorney, Agent, or Firm* — Alleman Hall McCoy Russell & Tuttle LLP (57) ABSTRACT

An electric vehicle is provided. The electric vehicle may include a motor for driving a wheel; a brake device for braking the wheel in response to a driver's operation of a brake operation member; and a controller for controlling the motor in response to the driver's operation of an accelerator operation member. The controller may include a first motor control section for causing the motor to be placed in a regenerative braking mode to generate a first regenerative braking force, when a displacement amount of the accelerator operation member decreases to an amount less than a predetermined reference displacement amount; and a second motor control section for causing the motor to generate a second regenerative braking force which is a sum of the first regenerative braking force and a predetermined additional braking force, in response to the operation of the brake operation member.

9 Claims, 6 Drawing Sheets

ELECTRIC VEHICLE

BACKGROUND OF THE INVENTION

1. Field of the Invention

The present invention generally relates to an electric vehicle including an electric motor as a driving power source. Particularly, the present invention relates to regenerative braking control during deceleration of the electric vehicle.

2. Description of the Related Art

Conventionally, in an electric vehicle including an electric motor as a driving power source, during deceleration, the motor is actuated by a force applied by wheels. Thereby, the motor generates a braking force to be applied to the wheels, and operates as an electric generator to charge a battery. This operation is generally referred to as regenerative braking, in which kinetic energy of the vehicle is converted into electric energy. In this way, the kinetic energy is recovered.

For example, Japanese Laid-Open Patent Application Publication No. Hei. 05-191904 discloses a technique in which a regenerative braking force corresponding to a typical engine braking force is generated based on the degree to which an accelerator is open (accelerator displacement amount) in an electric vehicle including a motor as a driving power source. According to this disclosure, a small degree to which an accelerator pedal is depressed by a driver is set as a reference accelerator displacement amount. When an accelerator displacement amount is not less than the reference accelerator displacement amount, the wheels are driven by the motor, whereas when the accelerator displacement amount is less than the reference accelerator displacement amount, regenerative braking is initiated.

However, in this technique, when the driver is depressing a brake pedal and a service brake is actuated, regenerative braking does not occur. Because of this, if the driver depresses the brake pedal, the kinetic energy of the electric vehicle cannot be recovered. Since the regenerative braking force cannot be utilized, a burden placed on the service brakes tends to increase.

SUMMARY OF THE INVENTION

The present invention addresses the above described condition, and an object of the present invention is to recover kinetic energy of a vehicle during a driver's brake operation and to lessen the burden placed on the service brake.

According to the present invention, an electric vehicle comprises a motor for driving a wheel; a brake device for braking the wheel in response to a driver's operation of a brake operation member; and a controller for controlling the motor in response to the driver's operation of an accelerator operation member; wherein the controller includes: a first motor control section for causing the motor to be placed in a regenerative braking mode to generate a first regenerative braking force, when a displacement amount of the accelerator operation member decreases to an amount less than a predetermined reference displacement amount; and a second motor control section for causing the motor to generate a second regenerative braking force which is a sum of the first regenerative braking force and a predetermined additional braking force, in response to the operation of the brake operation member.

In accordance with this configuration, when the driver decreases the displacement amount of the accelerator operation member to an amount less than the predetermined reference displacement amount during driving of the electric vehicle, the first motor control section causes the motor to be placed in the regenerative braking mode to generate the first regenerative braking force. By setting the magnitude of the first regenerative braking force to, for example, a magnitude which is substantially equal to a magnitude of a typical engine braking force, the driver can enjoy an engine braking feeling similar to that of a conventional vehicle including a general engine.

Then, when the driver operates the brake operation member, the second motor control section causes the motor to generate the second regenerative braking force which is a sum of the first regenerative braking force and a predetermined additional braking force, in response to this operation. That is, in response to the driver's operation of the brake operation member, the regenerative braking force increases, and hence more kinetic energy can be recovered. In addition, the driver can enjoy a natural braking feeling, because the braking force increases in response to the driver's depressing operation of the brake operation member.

Since the regenerative braking force increases in response to the driver's depressing operation of the brake operation member, the burden placed on the service brake can be lessened. This can reduce brake capacity. Therefore, cost reduction is achieved. The braking force generated in the vehicle in response to the driver's depressing operation of the brake operation member is a sum of the braking force generated by the service brake and the regenerative braking force. In view of the braking feeling, the magnitude of the second regenerative braking force may be set to, for example, $1/5 \sim 1/4$ of the magnitude of a typical braking force generated by the service brake. The second regenerative braking force may change or may not change according to the displacement amount of the brake operation member.

The above and further objects, features and advantages of the invention will more fully be apparent from the following detailed description with reference to the accompanying drawings.

DETAILED DESCRIPTION OF THE PREFERRED EMBODIMENTS

Hereinafter, an embodiment of the present invention will be described with reference to the drawings. Throughout the drawings, the same or corresponding components are identified by the same reference numerals and will not be described in repetition. The stated directions are referenced from the perspective of a driver riding in the electric vehicle.

Figure 1:
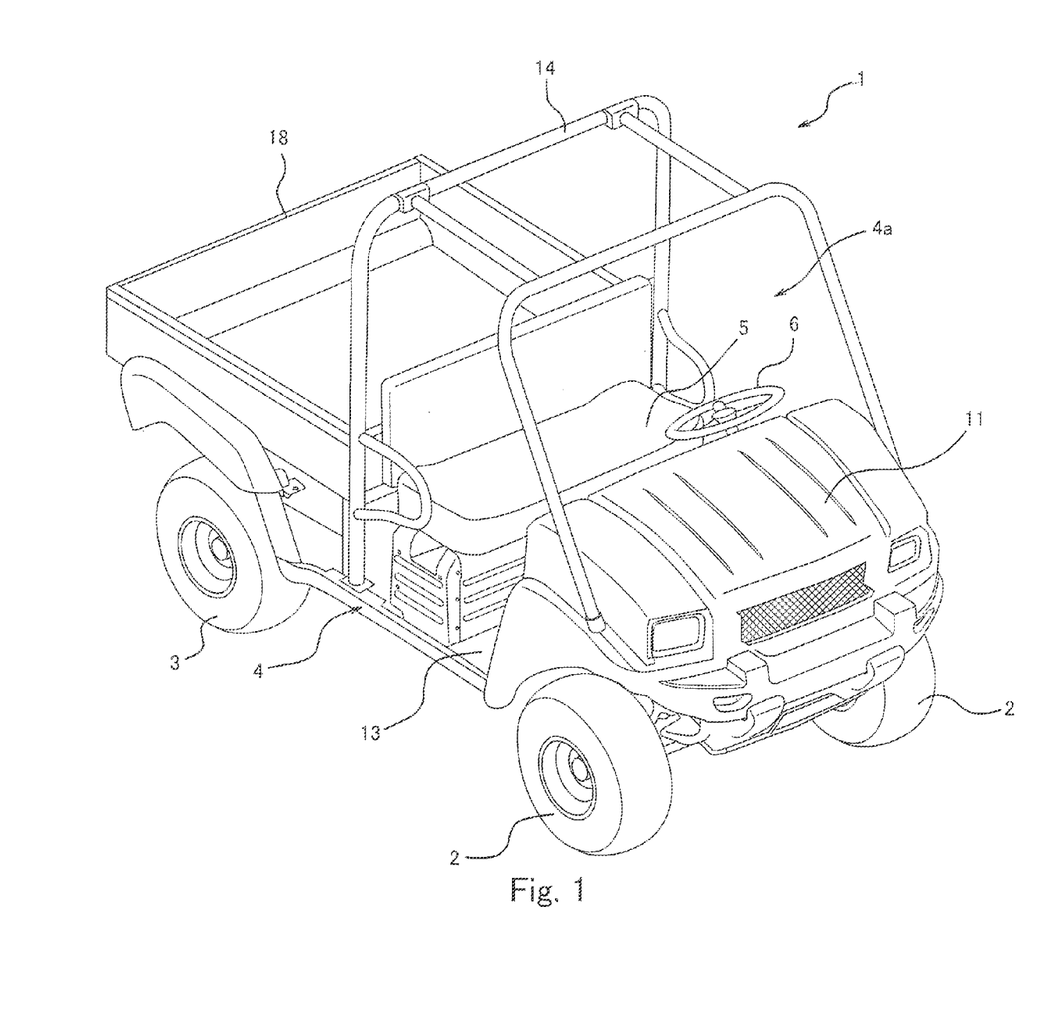
FIG. 1 is a perspective view of a hybrid vehicle according to an embodiment of the present invention, when viewed from leftward and obliquely forward.
Figure 2:
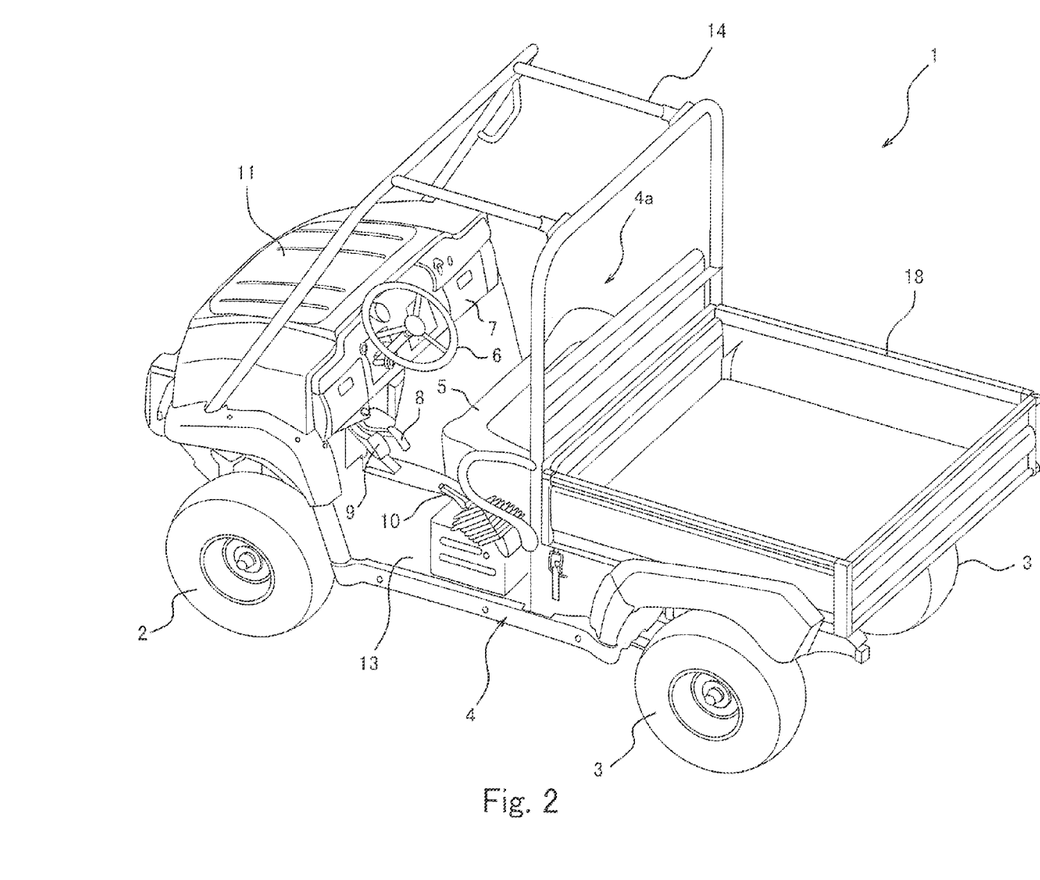
FIG. 2 is a perspective view of the hybrid vehicle when viewed from rightward and obliquely rearward.
Figure 3:
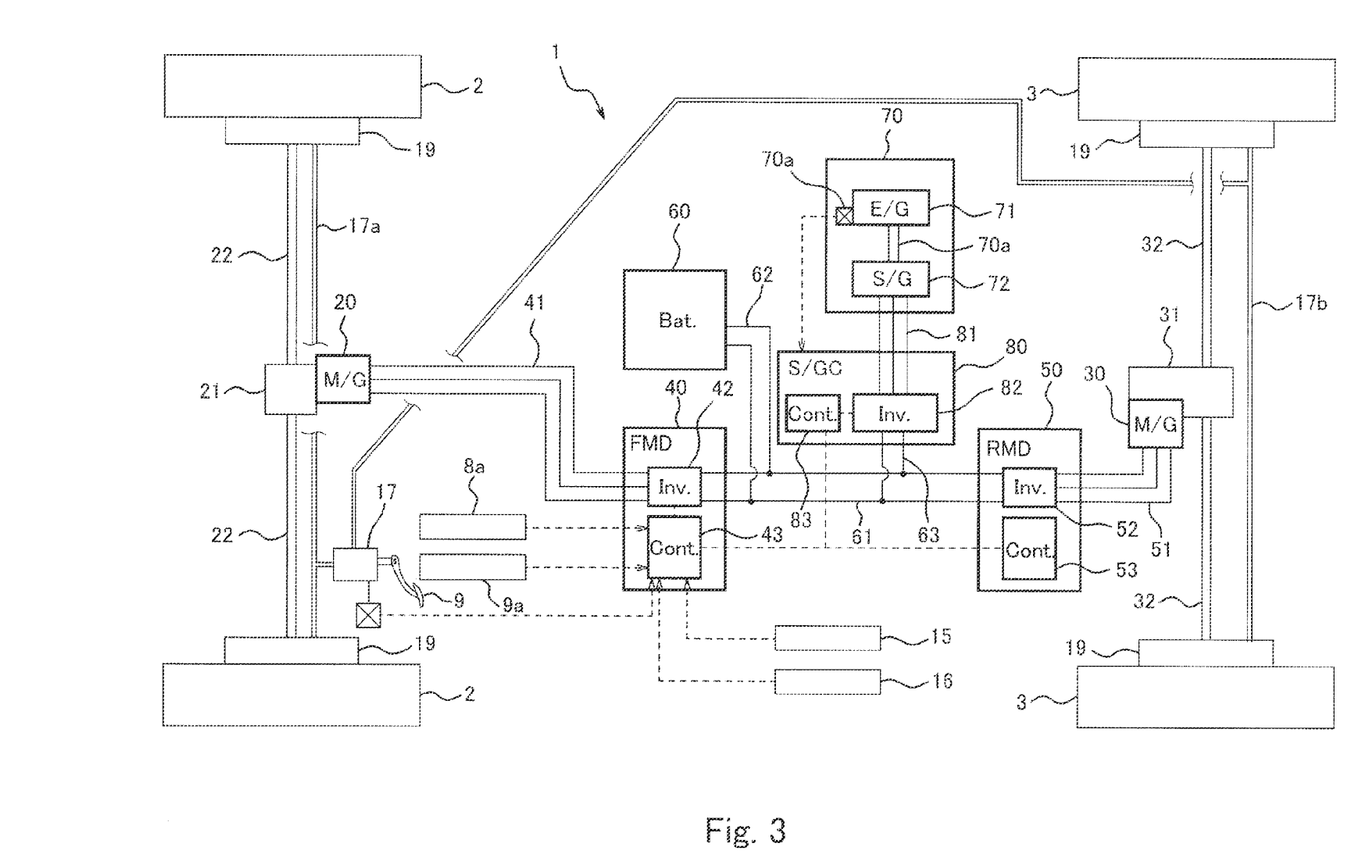
FIG. 3 is a block diagram schematically showing a drive control system in the hybrid vehicle.

FIGS. 1 and 2 are perspective views of an external appearance of a utility vehicle 1 which is an embodiment of the electric vehicle according to the present invention. FIG. 3 is a block diagram schematically showing a drive control system in the utility vehicle 1. Referring to FIGS. 1 and 2, the utility vehicle 1 includes right and left front wheels 2 attached with balloon tires (low-pressure tires), right and left rear wheels 3 attached with balloon tires (low-pressure tires), and a vehicle body 4 from which the wheels 2 and 3 are suspended. A cabin space 4a for passengers is provided in a center portion of the vehicle body 4 in a forward and rearward direction (lengthwise direction of the utility vehicle 1). A bench seat 5 (driver seat) which is laterally elongated is provided in a substantially center portion of the wheel bases of the front and rear wheels 2 and 3. As used herein, the utility vehicle refers to a multi-purpose vehicle, for example, a golf cart, a farming truck, etc.

The front wheels 2 of the utility vehicle 1 are steering wheels and are turned to the right or to the left according to driver's steering of the handle 6. As shown in FIG. 2, the handle 6 is supported on a handle post extending upward from the dash board 7 such that it is tilted slightly rearward. Below the handle 6, an accelerator pedal 8 and a brake pedal 9 are provided. The driver seated on a left portion of the seat 5 can depress the accelerator pedal 8 or the brake pedal 9, while gripping the handle 6. A side brake lever 10 is provided in the vicinity of the left end of the seat 5 to allow the driver to easily operate the side brake lever 10 with a left hand.

The front portion of the vehicle body which is forward relative to the cabin space 4a is covered with a hood 11 extending forward from the upper end of the dash board 7. Below the hood 11, there are provided front suspension devices which suspend the right and left front wheels 2 such that the right and left front wheels 2 are vertically pivotable, and a steering device for turning the front wheels 2 according to the driver's steering of the handle 6. In addition, below the hood 11, there is provided a drive system for actuating the front wheels 2 by an electric front motor 20 (front wheel motor), as will be described later with reference to FIG. 3.

A floor panel 13 extends rearward from the lower end of the dash board 7 in the cabin space 4a. A cabin frame 14 is provided above the floor panel 13. The cabin frame 14 serves as a roll cage (ROPS). In the present embodiment, a substantially left part of a space surrounded by the cabin frame 14 is a space for the driver. As described above, the handle 6 is attached on the left portion of the dash board 7. In addition, driving operation devices such as a key switch 15, a mode input device 16, and the like, are attached on the left portion of the dash board 7 and positioned to enable the driver to manipulate them easily.

The key switch 15 is a main switch for turning ON/OFF a power supply of the utility vehicle 1. The mode input device 16 is operated by the driver to select a driving mode of the utility vehicle 1. Exemplary driving modes are an EV mode in which the utility vehicle 1 drives only by electric power supplied from a battery unit 60, and a HV mode in which the utility vehicle 1 receives electric power from an engine electric generator 70, in addition to the battery electric power, as described later, but another driving mode may be used. The mode input device 16 may be implemented by, for example, a press button, a toggle switch, or a rocker switch.

A cargo bed 18 is provided behind and in close proximity to the cabin space 4a. Below the cargo bed 18, there are provided rear suspension devices which suspend the right and left rear wheels 3 such that the right and left rear wheels 3 are vertically pivotable, and a drive system for actuating the rear wheels 3 by an electric rear motor 30 (rear wheel motor), as will be described with reference to FIG. 3. Below the cargo bed 18, an engine room (not shown) is provided, and accommodates the engine electric generator 70, and motor drivers 40 and 50 for controlling electric power supply to the front motor 20 and the rear motor 30, respectively, as described later.

—Configuration of Drive Control System—

Referring to FIG. 3, the utility vehicle 1 is a four-wheel-drive vehicle in which the front wheels 2 are actuated by the front motor 20 and the rear wheels 3 are actuated by the rear motor 30. Note that a front wheel drive system for actuating the front wheels 2 is not mechanically coupled to a rear wheel drive system for actuating the rear wheels 3. A driving power of the front motor 20 is transmitted to the right and left front wheels 2 via a front axle 21 having a reduction gear pair and a differential gear mechanism (not shown) and a pair of drive shafts 22. Likewise, a driving power of the rear motor 30 is transmitted to the right and left rear wheels 3 via a rear transaxle 31 and a pair of drive shafts 32.

A service brake 19 constituted by, for example, a drum brake is provided for each of the front wheels 2 and the rear wheels 3. In response to the driver's depressing operation of the brake pedal 9, a hydraulic brake pressure generated in a master cylinder 17 is fed to each of the service brakes 19 corresponding to the right and left front wheels 2 via a front pipe 17a and to each of the service brakes 19 corresponding to the right and left rear wheels 3 via a rear pipe 17b, and a braking force is applied to the front wheels 2 and the rear wheels 3. In the present embodiment, as the service brakes 19 for the front wheels 2 and the rear wheels 3, drum brake units are used, and are adapted to apply a brake force of a substantially equal magnitude, to the wheels 2 and 3.

The motor drivers 40 and 50 for actuating the front and rear motors 20 and 30, respectively, are accommodated below the cargo bed 18 as described above. The battery unit 60 for supplying the electric power to the motor drivers 40 and 50 is accommodated in the cabin space 4a, below the seat 5, for example. The front motor driver 40 (FMD) converts DC power into three-phase AC power and supplies the three-phase AC power to the front motor 20 via three-phase lines 41. The rear motor driver 50 (RMD) converts DC power into three-phase AC power and supplies the three-phase AC power to the rear motor 30 via three-phase lines 51. The motors 20 and 30 are constituted by, for example, three-phase induction electric motors, and each of them is a motor/generator (M/G) which is capable of switching between a motor operation and a power generation operation.

In the present embodiment, the motor drivers 40 and 50 have basically the same configuration. Therefore, the front motor driver 40 will be described in detail. Although not depicted in detail, the front motor driver 40 includes an inverter 42 constituted by a three-phase (u-phase, v-phase, w-phase) bridge circuit, and a controller 43 for controlling the ON/OFF operation of each switching element (IGBT, etc.). The controller 43 controls the inverter 42 by, for example, PWM (pulse-width modulation) control so that the inverter 42 converts the DC power supplied from the battery unit 60 into AC power and outputs the AC power with a phase difference of 120 degrees through output terminals of u-phase, v-phase and w-phase. The controller 43 also controls the amplitude and frequency of the AC power.

By the AC power supplied from the front motor driver 40 in the above manner, the front motor 20 is actuated, to drive the right and left front wheels 2 via the transaxle 21 and the drive shafts 22. In the front motor driver 40, the controller 43 performs the PWM control of the inverter 42, to control the amplitude and frequency of the AC power, and hence the output torque and output rotational speed of the front motor 20, i.e., the driving torque and rotational speed of the front wheels 2. In the same manner, in the rear motor driver 50, the controller 53 performs the PWM control of the inverter 52, to control the amplitude and frequency of the AC power, and hence the output torque and output rotational speed of the rear motor 30, i.e., the driving torque and rotational speed of the rear wheels 3.

When the driver is depressing the accelerator pedal 8 during driving of the utility vehicle 1, the output torque of the front motor 20 and the output torque of the rear motor 30 are fundamentally controlled by the front motor driver 40 and the rear motor driver 50, respectively, according to the degree (accelerator displacement amount or level) to which the accelerator pedal 8 is depressed. As the driving torque of the front wheels 2 and the driving torque of the rear wheels 3 increases, the rotational speeds of them, i.e., the vehicle speed of the utility vehicle 1 increases. On the other hand, as the driving torque of the front wheels 2 and the driving torque of the rear wheels 3 decreases, the rotational speeds of them, i.e., the vehicle speed of the utility vehicle 1 decreases.

When the driver releases the accelerator pedal 8 to decelerate the utility vehicle 1, the front motor 20 is rotated by the force applied by the front wheels 2 and the rear motor 30 is rotated by the force applied by the rear wheels 3 to perform regenerative braking. That is, the front motor 20 and the rear motor 30 operate as AC electric generators. The AC power generated by the front motor 20 is sent to the inverter 42 via the AC lines 41 and is converted into the DC power charged into the battery unit 60, while the AC power generated by the rear motor 30 is sent to the inverter 52 via the AC lines 51 and is converted into the DC power charged into the battery unit 60.

To be specific, as shown in FIG. 3, the inverter 42 of the front motor driver 40 and the inverter 52 of the rear motor driver 50 are coupled together via first DC lines 61 and are coupled to the battery unit 60 via second DC lines 62 connected to a portion of the first DC lines 61. In this way, DC power is allowed to flow among the inverter 42, the inverter 52, and the battery unit 60 according to terminal voltages, respectively, via the first DC lines 61 or the second DC lines 62 coupling the inverters 42 and 53 and the battery unit 60.

The battery unit 60 is a secondary battery pack of, for example, a lead storage battery, a nickel-metal hydride battery, or a lithium ion battery. The battery unit 60 is composed of a plurality of battery modules connected in series or in parallel (not shown), and provides a voltage and capacity required for actuating the utility vehicle 1. A terminal voltage of the whole battery unit 60 is set to, for example, 45~50V. To protect passengers from a high voltage, the DC lines 61 and 62 are in a floating condition in which they are insulated from a body earth of the utility vehicle 1.

In the present embodiment, for example, a current sensor 62a and a voltage sensor 62b are attached on the second DC lines 62 to detect a value of current and terminal voltages during charging/discharging of the battery unit 60. As described later, in the present embodiment, the output of the current sensor 62a and the output of the voltage sensor 62b are sent to the controller 43 of the front motor driver 40, which calculates the value of a state of charge (SOC), etc., based on the detected current value and the detected voltage value.

In the present embodiment, the utility vehicle 1 is a hybrid vehicle, which includes an engine electric generator 70 for supplying the electric power to the front motor 20, the rear motor 30 and the battery unit 60. For example, the engine electric generator 70 includes an electric generator 72 and a reciprocating engine 71 and has a unitary structure in which the electric generator 72 is coupled integrally with the end portion of a crankshaft 71a of the reciprocating engine 71. The engine 71 is started according to the value of SOC of the battery unit 60 and actuates the electric generator 72.

For example, the electric generator 72 is a three-phase induction electric generator which is capable of switching between a motor operation and a power generation operation. The electric generator 72 is a starter/generator (S/G) which functions as a starter of the engine 71 during the motor operation. The electric generator 72 is coupled to an inverter 82 of an S/G controller 80 (S/GC) via three-phase (u-phase, v-phase, w-phase) AC lines 81. The inverter 82 is coupled to the first DC lines 61 via third DC lines 63, respectively. At the start of the engine 71, the inverter 82 is controlled by the controller 83 to supply the three-phase AC power to the electric generator 72 via the AC lines 81, thereby allowing the electric generator 72 to operate as a motor.

Upon the engine 71 starting, the electric generator 72 actuated by the engine 71 generates AC power, which is sent to the inverter 82 of the S/G controller 80, via the AC lines 81. The inverter 82 converts AC power into DC power, which is sent to the third DC lines 63. Then, DC power flows to the first DC lines 61 through the third DC lines 63. The inverter 42 of the front motor driver 40 and the inverter 52 of the rear motor driver 50 convert DC power into the three-phase AC power, which is used to actuate the front motor 20 and the rear motor 30. The DC power flowing through the first DC lines 61 and then the second DC lines 62 is charged into the battery unit 60.

In the present embodiment, the engine 71 of the engine electric generator 70 is, for example, a gasoline engine, and includes a carburetor (not shown) including a throttle valve which throttles a flow of intake air. By changing the opening degree of the throttle valve, the amount of an air-fuel mixture suctioned into a cylinder of the engine 71 changes, and an engine driving power output changes. An actuator for opening and closing the throttle valve is controlled by the controller 83 of the S/G controller 80. The controller 83 also controls feeding of a fuel to the carburetor, or ignition of the air-fuel mixture in the cylinder.

As described above, in the present embodiment, in the engine room below the cargo bed 18, the engine electric generator 70, the rear motor 30, and the rear transaxle 31 are accommodated. In addition, the front motor driver 40, the rear motor driver 50, and the S/G controller 80 are accommodated in the engine room. Because of this layout, by displacing the cargo bed 18 upward, maintenance of mechanical components such as the engine electric generator 70, the rear motor 30, and the rear transaxle 31, is carried out easily, and maintenance of the motor drivers 40 and 50 and the S/G controller 80 which are subjected to a high voltage, is carried out easily. The engine electric generator 70 which tends to elevate its temperature, is positioned at a right part of the engine room, and the motor drivers 40 and 50, and the S/G controller 80 are positioned at a left part of the engine room in order to prevent the motor drivers 40 and 50, and the S/G controller 80 from being damaged by heat radiated from the engine electric generator 70.

—Driving Action Control of Utility Vehicle—

In the driving action control of the utility vehicle 1 which is performed by the drive control system having the above described configuration, the motors 20 and 30 are controlled by using the inverters 42 and 52 of the front and rear motor drivers 40 and 50, respectively, and the engine electric generator 70 is activated as necessary. In the present embodiment, the controller 43 of the front motor driver 40 and the controller 53 of the rear motor driver 50 are connected interactively to the controller 83 of the S/G controller 80 via CAN (control area network), which realizes total control.

To be specific, each of the three controllers 43, 53, and 83 is basically constituted by a known microcontroller, and includes a CPU for executing programs, memories such as RAM or ROM, I/O bus, etc. In the present embodiment, hereinafter, it is assumed that the controller 43 of the front motor driver 40 is a master controller, and performs predetermined calculation based on outputs of sensors indicating vehicle states. Then, the controller 43 (hereinafter referred to as master controller 43) outputs control commands to the controller 53 of the rear motor driver 50 and to the controller 83 of the S/G controller 80, respectively.

Figure 4:
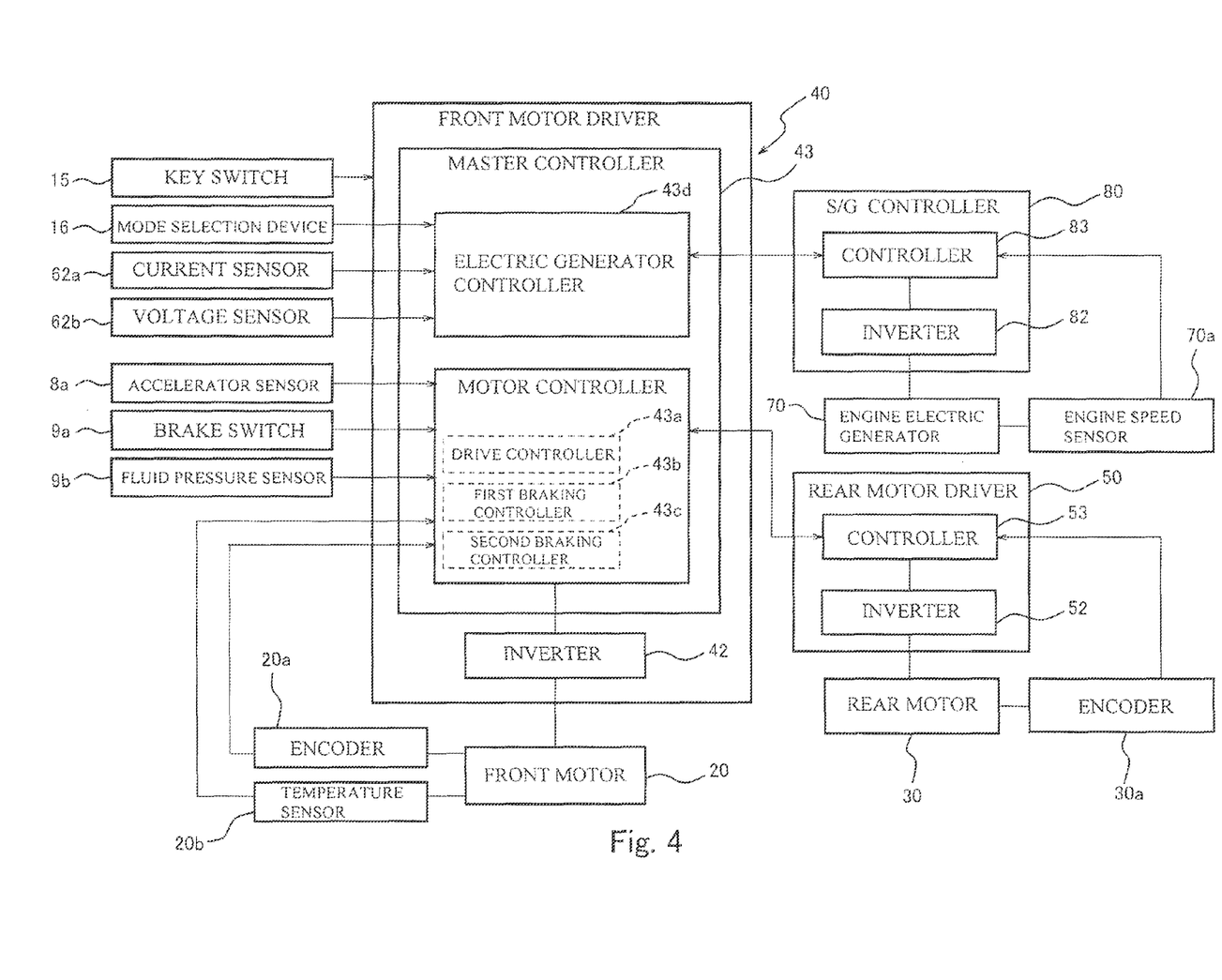
FIG. 4 is a block diagram showing a configuration of major components of the drive control system in the hybrid vehicle.

To be specific, as shown in FIG. 4, the master controller 43 receives as inputs of information indicating the driver's operation, a signal from an accelerator sensor 8a for detecting the degree (accelerator displacement amount) to which the accelerator pedal 8 has been depressed by the driver, a signal from a brake switch 9a for detecting the degree (brake displacement amount) to which the brake pedal 9 has been depressed by the driver, a signal from a fluid-pressure sensor 9b for detecting a hydraulic brake pressure, a signal from the key switch 15, a signal from the mode selection device 16, etc. In addition, the master controller 43 receives as inputs, a signal from the current sensor 62a attached on the second DC line 62, a signal from the voltage sensor 62b attached on the second DC line 62, a signal from an encoder 20a built into the front motor 20, and a signal from a temperature sensor 20b (e.g., temperature sensor for detecting a hall IC temperature of the front motor 20) built into the front motor 20, etc.

A signal from an encoder 30a built into the rear motor 30 is input to the controller 53 of the rear motor driver 50, and then is sent from the controller 53 to the master controller 43 as a signal indicating the rotational speed of the rear motor 30. In the above described manner, the sensors, the switches and others for controlling driving action of the utility vehicle 1 are coupled to the master controller 43 directly or indirectly via CAN. The signals from the sensors and the switches are input to the master controller 43.

The master controller 43 includes a motor controller for controlling the motors 20 and 30 by using the inverters 42 and 52 based on the signals from the sensors and the switches so that the utility vehicle 1 drives in response to the driver's operation. The motor controller includes a drive controller 43a for controlling driving torque applied by the front motor 20 to the front wheels 2 and driving torque applied from the rear motor 30 to the rear wheels 3, based on at least the signal from the accelerator sensor 8a, the signal from the encoder 20a built into the front motor 20, and the signal from the encoder 30a built into the rear motor 30.

The drive controller 43a determines target torque (positive value) of the front motor 20, and target torque (positive value) of the rear motor 30, based on the accelerator displacement amount, a vehicle speed, etc. The drive controller 43a performs PWM control of the inverter 42 so that the front motor 20 outputs the target torque. In addition, the drive controller 43a outputs a target torque value of the rear motor 30 to the controller 53 of the rear motor driver 50. Receiving the target torque value, the controller 53 controls the inverter 52 so that the output torque of the rear motor 30 reaches the target torque.

The motor controller of the master controller 43 further includes first and second braking controllers 43b and 43c for controlling the braking torque applied by the front motor 20 to the front wheels 2 and the braking torque applied by the rear motor 30 to the rear wheels 3, based on the signal from the brake switch 9a, and the signal from the fluid pressure sensor 9b, in addition to the signal from the accelerator sensor 8a, and the signals from the encoders 20a and 30a. The braking controllers 43b and 43c determine target torque (negative value) of the front motor 20 and target torque (negative value) of the rear motor 30 based on the brake displacement amount, the vehicle speed, etc, and output signals indicating the target torques to the inverter 42, and to the controller 53.

As described later in detail, the first braking controller 43b is a first motor control section for generating first regenerative braking torque (first regenerative braking force) which is substantially equal in magnitude to a typical engine braking force, when the accelerator displacement amount decreases to zero (less than a reference displacement amount). The second braking controller 43c is a second motor control section for generating second regenerative braking torque (second regenerative braking force) which is a sum of the first regenerative braking torque and predetermined additional braking torque (additional braking force), in response to the driver's operation.

In the present embodiment, the master controller 43 further includes an electric generator controller 43d which selects a driving mode of the utility vehicle 1 and generates an operation command of the engine electric generator 70, based on the signal from the mode input device 16, the value of the SOC of the battery unit 60, etc. The electric generator controller 43d fundamentally selects the EV mode or the HV mode based on the signal from the mode input device 16. The electric generator controller 43d selects the HV mode if the value of the SOC of the battery unit 60 is lower than a predetermined lower limit value. The electric generator controller 43d outputs a control command to the S/G controller 80.

Receiving this command value, the controller 83 controls the operation of the engine electric generator 70. To be specific, the engine electric generator 70 is attached with an engine speed sensor 70a for detecting the engine speed of the engine 71 and the rotational speed of the engine electric generator 70. The signal output from the engine speed sensor 70a is input to the controller 83. Based on the signal from the engine speed sensor 70a, the controller 83 controls the opening degree of the throttle valve of the engine 71 so that the engine speed reaches a target engine speed. The electric generator controller 43d determines the target electric engine speed based on the vehicle states of the utility vehicle 1, such as the accelerator displacement amount, or the vehicle speed, and provides the target engine speed as a control command.

The controller 83 controls the inverter 82 to control the operation of the electric generator 72 during running of the engine 71. To be specific, the controller 83 causes the electric generator 72 to be activated or stop in accordance with the control command provided by the electric generator controller 43d of the master controller 43. That is, in the present embodiment, the electric generator controller 43d of the master controller 43 and the controller 83 of the S/G controller 80 implement a function of an engine electric generator controller for controlling the operation of the engine electric generator 70.

Hereinafter, a specific procedure of the driving action control of the utility vehicle 1 of the present embodiment will be described with reference to the flowcharts of FIGS. 5 and 6. When the key switch 15 of the utility vehicle 1 is turned ON, the contactors are closed, and the electric power starts to flow between the battery unit 60 and the motor drivers 40 and 50. Thereupon, the control procedure starts. This control procedure is repeated until the key switch 15 is turned OFF.

—Driving Action Control—

Firstly, the driving action control of the utility vehicle 1 of the present embodiment will be described. Referring to the flowchart of FIG. 5, after the start, the master controller 43 receives the signals from the sensors and the switches 8a, 9a, 15, etc., and reads data from a predetermined area of the memory as necessary (step S1). The master controller 43 determines whether or not the accelerator pedal 8 has been depressed based on the signal from the accelerator sensor 8a (step S2: accelerator ON?). If NO in step S2, the process moves to the flow of FIG. 6. On the other hand, if YES in step S2, in step S3, the master controller 43 determines whether or not a condition (hereinafter referred to as an economical driving condition) used for driving the utility vehicle 1 by using only either one of the motors 20 and 30 is met.

In step S3, the master controller 43 determines that the condition is met, at least either when a remaining driving distance of the utility vehicle 1 (a distance over which the utility vehicle 1 is going to travel from now on) is not more than a preset distance, or the displacement amount of the accelerator pedal 8 is not more than a preset amount (low load state). For example, the remaining driving distance may be calculated, based on the value of the SOC of the battery unit 60, the amount of a fuel oil which can be supplied to the engine 71, or a cumulative driving distance in a period which passes from a time point when the utility vehicle 1 was fed with the fuel oil most recently, to a current time.

The above stated low load state refers to a state in which either one of the front and rear motors 20 and 30 is actuated to lessen a driving power loss and suppress heat generation in the motors 20 and 30, and the inverters 42 and 52, in view of a mechanical driving loss, or efficiency of the motors 20 and 30, and the inverters 42 and 52. This state is found preliminarily from an experiment or the like. If it is determined that the economical driving condition is met (YES in step S3), the drive controller 43a sets the target torque of one of the front and rear motors 20 and 30 to zero. The drive controller 43a determines the target torque of the remaining motor 20 or 30 with reference to a map similar to a driving torque map as described below (step S4: determine target torque during economical driving).

When the utility vehicle 1 is driven by using only one of the front and rear motors 20 and 30 as described above, economical driving with a lesser energy loss is realized, but drivability may be limited. As a solution to this, if the displacement amount of the accelerator pedal 8 is greater than a predetermined amount even when the remaining driving distance is not more than the preset distance, the front and rear wheels 2 and 3 may be driven by using both of the front and rear motors 20 and 30. By driving both of the front and rear wheels 2 and 3 as necessary, even in the middle of economical driving, a driving mobility unique to the four-wheel-drive vehicle is attained.

On the other hand, if it is determined that the economical driving condition is not met (step S3: NO), the drive controller 43a determines the target torque of the front motor 20 and the target torque of the rear motor 30, with reference to driving torque maps electronically stored in a memory (step S5). The maps contain suitable target torque values of the front motor 20 and target torque values of the rear motor 30, respectively corresponding to accelerator displacement amounts and vehicle speeds, for example, which values are found by experiment or the like. The vehicle speed may be calculated, based on the signal from the encoder 20a of the front motor 20 and the signal from the encoder 30a of the rear motor 30.

In the driving torque maps, the driving torque of the front motor 20 and the driving torque of the rear motor 30 may be set to different values, according to the vehicle states of the utility vehicle 1. As the vehicle states, the vehicle speed, acceleration, deceleration, lateral acceleration indicating how the utility vehicle 1 is turning, etc., may be used. The vehicle states may include the displacement amount of the accelerator pedal 8, the displacement amount of the brake pedal 9, the displacement speed of the accelerator pedal 8, the displacement speed of the brake pedal 9, a slip state of the front wheels 2, a slip state of the rear wheels 3, etc. According to these vehicle states, the magnitude of the driving torque of the front wheels 2 and the magnitude of the driving torque of the rear wheels 3 may be changed, thereby implementing suitable driving action control and improving a driving feeling.

To be specific, in the driving torque maps, the target torque of the front wheels 2 and the target torque of the rear wheels 3 may be set to greater values as the accelerator displacement amount becomes greater. Or, the target torque of the front wheels 2 and the target torque of the rear wheels 3 may be set to relatively greater values as the vehicle speed becomes higher, in view of a higher driving resistance. By comparison, when the vehicle speed is higher, the target torques may be set to relatively smaller values according to an increase in the vehicle speed, because there arises a need for suppressing the attitude of the utility vehicle 1 from becoming unstable.

The front and rear motors 20 and 30 are controlled by using the inverter 42 of the front motor driver 40 and the inverter 52 of the rear motor driver 50, respectively so that the front and rear motors 20 and 30 output the determined target torques, respectively (step 6: drive control of motor). Thereby, the front motor 20 and the rear motor 30 are respectively independently supplied with the electric power and their torques are independently controlled. As a result, a driving mobility unique to the four-wheel-drive vehicle can be achieved even in a road surface condition, for example, a snowy road surface or a sandy road, in which a friction coefficient is very low.

In step S7, it is determined whether or not the EV mode should be selected, based on the signal from the mode input device 16, the value of the SOC of the battery unit 60, etc. (EV mode?). It is determined as YES, when the EV mode is selected by the driver using the mode input device 16 and the value of the SOC of the battery unit 60 is not less than a predetermined lower limit value. On the other hand, it is determined as NO, when the HV mode is selected by the driver using the mode input device 16 and the value of the SOC of the battery unit 60 is less than the predetermined lower limit value.

If it is determined as YES and EV mode is selected in step S7, and if the engine electric generator 70 is activated to generate electric power (YES in step S8), the electric generator controller 43d sends an engine stop command to the controller 83 of the S/G controller 80, to stop the operation of the engine electric generator 70 (step S9). In response to this engine stop command, the controller 83 fully closes the throttle valve of the engine 71 and stops the feeding of the fuel and the ignition of the air-fuel mixture. As a result, the running of the engine 71 stops.

On the other hand, if it is determined as NO and HV mode is selected in step S7, and if the engine 71 is in a stopped state (YES in step S10), the electric generator controller 43d sends an engine start command to the controller 83 of the S/G controller 80, to start the engine 71. In response to this engine start command, the controller 83 causes the electric generator 72 of the engine electric generator 70 to operate as the motor. Thereby, the engine 71 starts cranking, feeding the fuel, and the ignition of the air-fuel mixture. As a result, the engine 71 starts.

In a state where the engine 71 is running at a predetermined engine speed, the controller 83 causes the inverter 82 to convert the AC power generated in the electric generator 72 into DC power and send the DC power to the third DC lines 63. When the EV mode is selected (YES in step S7) and the engine 71 is in a stopped state (NO in step S8), the engine 71 maintains its state. When the HV mode is selected (NO in step S7) and the engine 71 is running (NO in step S10), the engine 71 maintains its state.

As described above, the control mode switches to the HV mode, as necessary, in which the engine electric generator 70 is activated to supplementarily supply the electric power to the front and rear motors 20 and 30. In the HV mode, reduction of the value of the SOC of the battery unit 60 is mitigated, and the driving distance of the utility vehicle 1 can be increased significantly. Since the control mode switches to the HV mode while monitoring the value of the SOC of the battery unit 60, the battery unit 60 is prevented from discharging to an excessive level, and because of this, the life of the batteries can be increased. Since the EV mode or the HV mode is fundamentally selected in response to the driver's operation of the mode input device 16, the driver's intention is reflected well in selection of the mode.

—Regenerative Braking—

Next, a control procedure of regenerative braking will be described with reference to the flow of FIG. 6. Referring to the flowcharts of FIGS. 5 and 6, if it is determined as NO (accelerator is OFF) in step S2 in the flowchart of FIG. 5, it is determined whether or not the utility vehicle 1 is in a stopped state in step T1 in the flowchart of FIG. 6. For example, if the vehicle speed is lower than a predetermined small value (e.g., 2~3 km/h), it is determined that the utility vehicle 1 is in a stopped state (YES in step T1), and the process moves to steps T11~T14. On the other hand, if it is determined that the vehicle speed is not lower than the predetermined value (NO in step T2), it is determined that the utility vehicle 1 is in a coasting state.

Then, it is determined whether or not the brake pedal 9 has been depressed, based on the signal from the brake switch 9a (step T2: brake ON?). If it is determined as NO (brake OFF), it may be estimated that the driver has released the accelerator pedal 8 but does not depress the brake pedal 9 yet. In this case, the first braking controller 43b causes at least one of the front motor 20 and the rear motor 30 to be placed in a regenerative braking mode, and sets a controlled target value of the braking torque to a relative small value substantially equal to a magnitude of a typical engine braking force (step T3: determine target braking torque substantially equal to engine braking).

In the present embodiment, to use a common control logic in the driving action control and the regenerative braking control, the target value is set to a negative value in the regenerative braking control. Hereinafter, for clarity of description, the negative target torque in the regenerative braking is referred to as a target braking torque, and its value is assumed to be an absolute value. For example, a target value (target braking torque) of the first regenerative braking torque substantially equal to the engine braking force is found by an experiment, etc., and may be electronically stored in the memory of the master controller 43. The value may be set to a constant value. Or, the value may be set in the form of a map or a table such that the value is greater as the vehicle speed is higher, or such that the value is smaller as the vehicle speed is higher.

The target braking torque may be set different between the front motor 20 and the rear motor 30 according to the vehicle states of the utility vehicle 1 including the vehicle speed. For example, when the vehicle speed is not lower than the predetermined value, the target braking torque may be set to an equal value for the front motor 20 and the rear motor 30, while when the vehicle speed is lower than the predetermined value, the target braking torque of the front motor 20 may be set to a greater value, and the target braking torque of the rear motor 30 may be set to a smaller value, according to a decrease in the vehicle speed. Or, when the vehicle speed is lower than the predetermined value, the target braking torque of the rear motor 30 may be set to zero, and only the front motor 20 may generate the braking torque.

If it is determined as YES (brake ON) in step T2, in step T4, the second braking controller 43c of the master controller 43 determines the target value of the braking torque of at least one of the front motor 20 and the rear motor 30 as a value greater than a value in the state of the brake OFF. To be specific, the value of the second regenerative braking torque generated in response to the driver's brake operation is determined as a sum of a value of the first regenerative braking torque and a value of predetermined additional braking torque. This increases efficiency of the regenerative braking, and increases a braking torque applied to the front wheels 2 and the braking torque applied to the rear wheels 3. Since the front and rear motors 20 and 30 have high responsiveness to control, and the regenerative braking torque generated by the motors 20 and 30 increases quickly, the driver can feel that the braking force is increasing, upon the driver's operation for depressing the brake pedal 9.

The magnitude of the second regenerative braking torque generated in response to the driver's operation of the brake pedal 9 may be made different between the front motor 20 and the rear motor 30. For example, the second braking controller 43c determines the target value (target braking torque) of the second regenerative braking torque with reference to braking torque maps electronically stored in the memory. These braking torque maps contain suitable second regenerative braking torque values of the front motor 20 and suitable second regenerative braking torque values of the rear motor 30, respectively, corresponding to brake displacement amounts and vehicle speeds, for example, which values are found by experiment or the like.

In the braking torque maps of the front motor 2 and the rear motor 30, the target braking torque of the front motor 20 may be set greater than the target braking torque of the rear motor 30, and the braking torque of the front motor 20 and the braking torque of the rear motor 30 may increase as the hydraulic brake pressure increases. Thus, the braking force increases as the displacement amount of the brake pedal 9 increases, which results in a natural braking feeling. Or, the magnitude of the second regenerative braking torque may be set not to change according to the hydraulic brake pressure.

The target braking torque may be set so that the braking torque of the front motor 20 and the braking torque of the rear motor 30 are greater as the vehicle speed is higher. With this setting, the regenerative braking torque decreases with a decrease in the vehicle speed, which results in a natural braking feeling. Or, the target braking torque may be set not to change according to the magnitude of the vehicle speed. Or, the ratio of allocation of the braking torque to the front and rear motors 20 and 30 may be changed according to the magnitude of the vehicle speed. For example, the ratio of allocation of the braking torque to the front motor 20 may be set greater, when the vehicle speed is higher. Or, only the front motor 20 may generate the braking torque when the vehicle speed is not lower than a predetermined value.

In the present embodiment, the same drum brake units are used as the service brakes 19 for all of the front and rear wheels 2 and 3. If the ratio of allocation of the second regenerative braking torque to the front motor 20 is set greater as described above, the braking torque applied to the front wheels 2 can be set greater than the braking torque applied to the rear wheels 3, along with the braking forces generated by the service brakes 19. This results in a natural braking feeling. In addition, during the braking, a vertical load (ground or contact load) of the front wheels 2 increases because of shifting of the load. Therefore, if the ratio of allocation of the braking torque applied to the front wheels 2 is set greater, the attitude of the utility vehicle 1 can be stabilized even in a slippery road surface condition. In addition, the kinetic energy can be recovered effectively at the front wheels 2 side where the ground load tends to increase. In view of these, the magnitude of the second regenerative braking torque may be set greater in the front motor 20 or rear motor 30, which is at a forward side in a moving direction of the utility vehicle 1 which moves forward or rearward.

Furthermore, the target braking torque value read from the braking torque map may be changed according to the vehicle states of the utility vehicle 1. For example, the ratio of allocation of the braking torque to the front motor 20 may be set greater as deceleration of the utility vehicle 1 is greater. Or, the ratio of allocation of the braking torque to the front motor 20 may be set greater when the utility vehicle 1 is turning than the utility vehicle 1 not turning, in order to stabilize the attitude of the utility vehicle 1 during the braking.

It may be determined how the utility vehicle 1 is turning, based on the degree to which the handle 6 is steered by the driver, or based on lateral acceleration. In that case, the utility vehicle 1 may be provided with a sensor for detecting a steering angle of the handle 6 or a sensor for detecting the lateral acceleration. Or, the utility vehicle 1 may be provided with a sensor for detecting a rotational speed difference between the right and left wheels (either one or both of the front wheels 2 and the rear wheels 3), and it may be determined how the utility vehicle 1 is turning, based on the output of the sensor.

Or, the rotational speed of the front motor 20 may be detected based on the signal from the encoder 20*a*, and the rotational speed of the rear motor 30 may be detected based on the signal from the encoder 30*a*. And, when either the front wheels 2 or the rear wheels 3 are locked, the braking torque applied to the locked wheels may be decreased, and the braking torque applied to the unlocked wheels may be increased, either one of which may occur, or both of which may occur. In brief, the ratio of allocation of the braking torque may be set greater for the wheels with a smaller slip ratio.

Instead of determining the second regenerative braking torque with reference to the braking torque map as described above, the second regenerative braking torque may be determined in such a manner that additional braking torque to be added to the first regenerative braking torque may be set in a map, and the additional braking torque read from the map may be added to the first regenerative braking torque. In this case, for example, the additional braking torque may be allocated with a priority to the front wheels 2 or the wheels which are at a forward side in the direction which the utility vehicle 1 moves. Or, the additional braking torque may be applied only to the front wheels 2 or the wheels which are at a forward side in the direction which the utility vehicle 1 moves. This makes it possible to simplify the process for determining the target braking torque. Instead of changing the ratio of allocation of the additional braking torque, the additional braking torque may be added in a first order to either the front wheels 2 or the rear wheels 3.

A ratio of the magnitude of the additional braking torque with respect to the magnitude of the first regenerative braking torque is substantially constant. The ratio of the magnitude of the additional braking torque may be set greater as the hydraulic brake pressure is higher. By the driver's depressing operation of the brake pedal 9, the utility vehicle 1 is applied with the second regenerative braking torque and the braking torque generated by the service brakes 19. To achieve a good braking feeling, the magnitude of the second regenerative braking torque may be set to $\frac{1}{5} \sim \frac{1}{4}$ of the braking torque generated by the service brake 19. With this setting, the driver will not feel discomfort even if the regenerative braking is disenabled due to a failure or the like.

When the first braking controller 43*b* or the second braking controller 43*c* of the master controller 43 determines the target braking torque value of the front motor 20 or the target braking torque value of the rear motor 30 (step T3, step T4), the front motor 20 is controlled by using the inverter 42 of the front motor driver 40, and the rear motor 30 is controlled by using the inverter 52 of the rear motor driver 50 (step T5: regenerative braking control of the motor). To be specific, at least one of front motor 20 and rear motor 30 rotates by the force applied by the front wheels 2 or the rear wheels 3, to operate as the AC electric generator. The generated AC power is supplied to the inverter 42 (52), via the AC lines 41 (51). The inverter 42 (52) converts AC power into DC power which is charged into the battery unit 60.

During the above operation, it is determined whether or not the engine electric generator 70 is activated (step T6). If YES in step T6, the electric generator controller 43*d* of the master controller 43 sends a stop command of the power generation operation to the controller 83 of the S/G controller 80. In response to the stop command, the controller 83 controls the inverter 82 so that the power generation operation of the electric generator 72 is stopped in a state where the engine 71 is running (step T7). The power generation operation of the electric generator 72 is stopped, to improve efficiency with which the kinetic energy can be recovered by the front motor 20 or the rear motor 30.

Then, it is determined whether or not a predetermined time has passed from when the accelerator pedal 8 is released (OFF) (step T8). If NO in step T8, it is determined whether or not the accelerator pedal 8 is depressed (ON) again (step T9). If NO in step T9, the process returns to step T8. If YES in step T8, the controller 83 may control the throttle valve opening degree of the engine 71, to gradually decrease the engine speed to an idling engine speed (step T10).

In brief, upon the accelerator pedal 8 being released (OFF), the power generation is stopped, whereas the engine 71 is not stopped but maintains its engine speed during a certain time period after the accelerator pedal 8 is released (OFF), and thereafter the throttle valve opening degree is gradually decreased so that the engine speed is gradually decreased. As a result, with deceleration of the utility vehicle 1, an engine noise diminishes while lessening wasteful fuel consumption, which results in a natural driving feeling.

In this case, the engine speed is gradually decreased in a range from a preset rated engine speed (e.g., 2000~3000 rpm) to a predetermined engine speed (e.g., 1500~2000 rpm), and is decreased to an idling engine speed (e.g., 1000~1600 rpm) quickly from the predetermined engine speed (e.g., 1500~2000 rpm), by closing the throttle valve rapidly. This is done to avert a vibration or noise emission of the engine electric generator 70 which is attributed to resonance of the mounting. After that, the idling engine speed is maintained until the utility vehicle 1 is stopped. If the accelerator pedal 8 is depressed again before the utility vehicle 1 is stopped (YES in step T9), the engine speed may be increased to the predetermined engine speed under no load condition, and thereafter, the power generation operation of the electric generator 72 may be initiated.

As described above, if YES (vehicle is stopped) in step T1, the process moves to step T11. In step T11, it is determined whether or not a predetermined time has passed from when the utility vehicle 1 is stopped. If NO in step T11, the process returns to step S1. On the other hand, if YES in step T11, it is determined whether or not the charging of the battery unit 60 is necessary based on the value of SOC of the battery unit 60, etc. (step T12). If YES in step T12, the engine speed is increased to the predetermined engine speed, and the power generation operation of the electric generator 72 is started. Then, the engine speed is increased gradually to the rated engine speed, and the battery unit 60 is charged (step T13).

Figure 5:
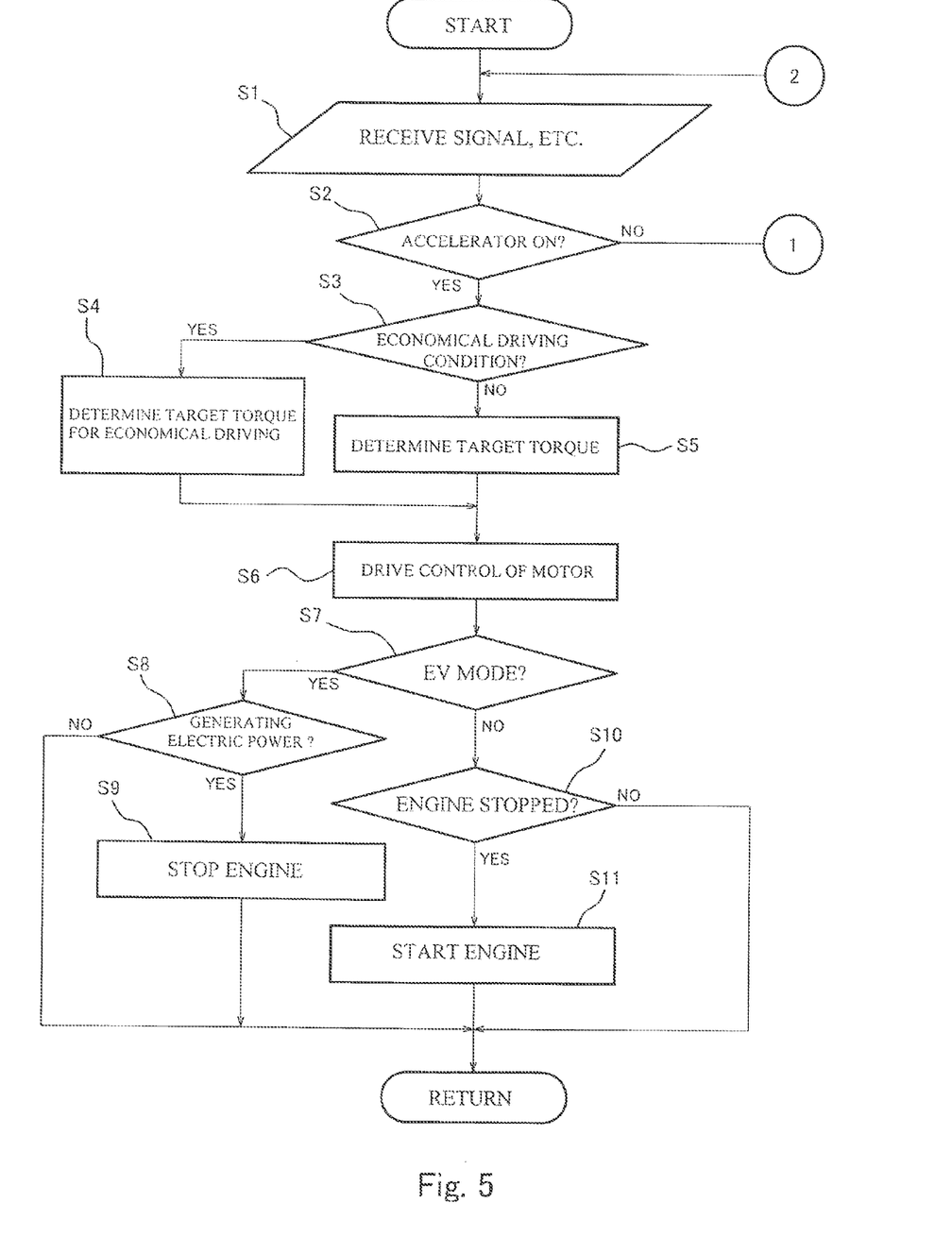
FIG. 5 is a flowchart of driving action control in which the hybrid vehicle is driven by the drive control system.
Figure 6:
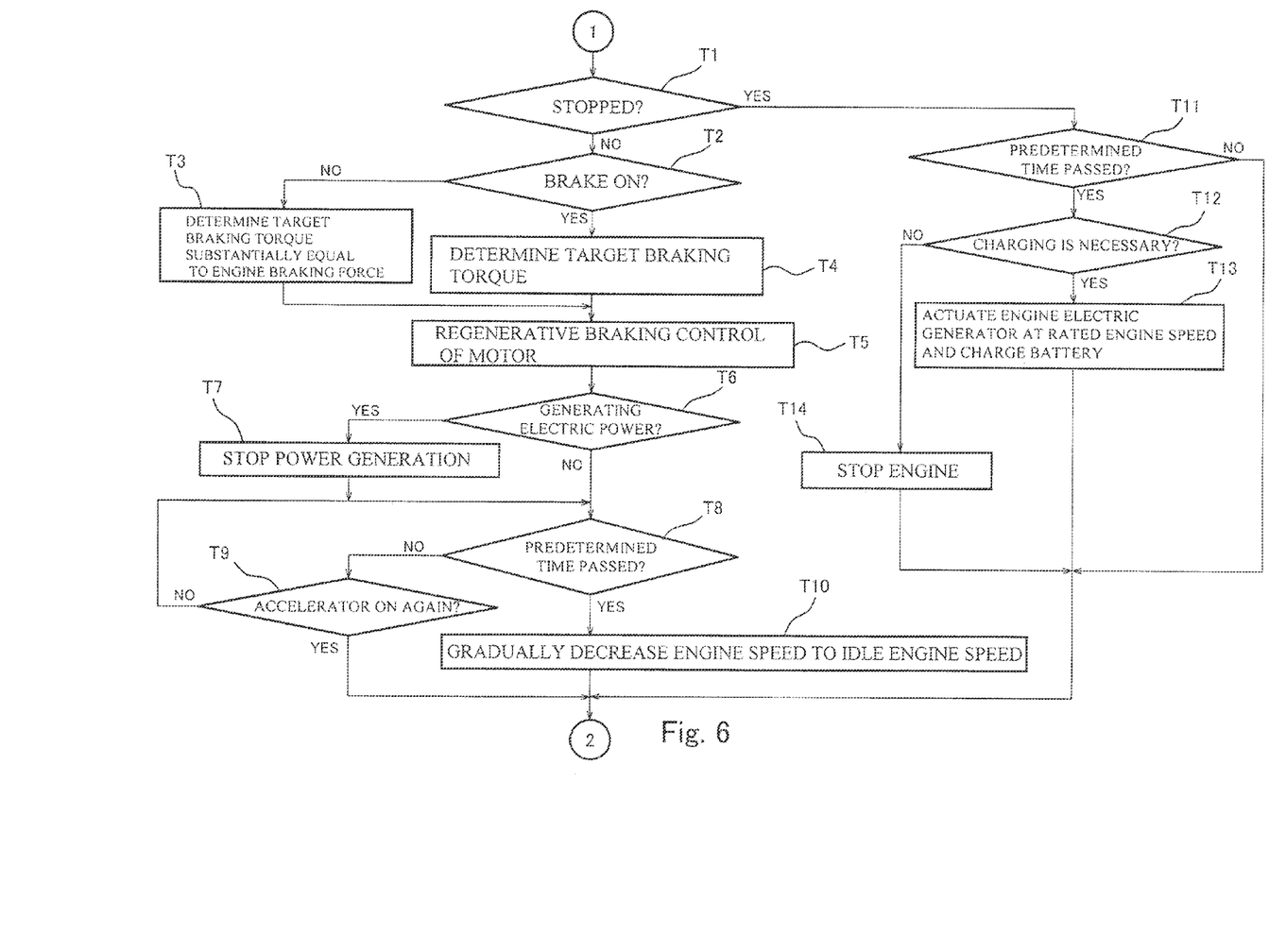
FIG. 6 is a flowchart of regenerative braking control in the drive control system.

When charging of the battery unit 60 progresses and it is determined that charging of the battery unit 60 is not necessary any more in step T12, the S/G controller 80 stops the engine 71 of the engine electric generator 70 (step T14), and the process returns to the start of the flowchart of FIG. 5. That is, if the key switch 15 is not turned OFF after a passage of the predetermined time after the utility vehicle 1 is stopped, the engine speed is increased to charge the battery unit 60 efficiently, and thereafter, the engine electric generator 70 is stopped.

As should be appreciated from the foregoing, in accordance with the utility vehicle 1 of the present embodiment, upon the driver depressing the accelerator pedal 8, at least one of the motors 20 and 30 drives the front wheels 2 or the rear wheels 3, in response to the driver's operation. The magnitude of the driving torque generated by the motor 20 (30) is changed according to the driver's depressing operation of the accelerator pedal 8, and thereby the vehicle speed of the utility vehicle 1 is changed.

On the other hand, when the driver releases the accelerator pedal 8 (accelerator is OFF), the motor 20 (30) is placed in the regenerative braking mode and generates the first regenerative braking torque substantially equal in magnitude to the typical engine braking force. This allows the driver to feel engine braking similar to that of a conventional utility vehicle including a general engine. The motor 20 (30) operates as the AC electric generator, and the generated AC power is charged into the battery unit 60. At this time, the power generation operation of the engine electric generator 70 is stopped, and thus, the motor 20 (30) can recover the kinetic energy with high efficiency.

After that, upon the driver depressing the brake pedal 9, the service brake 19 is actuated in response to this, and the motor 20 (30) generates the second regenerative braking torque greater than the first regenerative braking torque. The driver can enjoy a good braking feeling because the braking torque increases in response to the driver's brake operation, and more kinetic energy can be recovered. Because of the regenerative braking, a burden placed on the service brakes 19 can be lessened. Therefore, a capacity of the service brakes 19 can be reduced, which achieves cost reduction.

As described above, for a certain time period which passes from when the accelerator is released, the power generation operation of the engine electric generator 70 is stopped, but the engine 71 continues to running, so that the engine speed decreases gradually as the vehicle speed decreases. As a result, an engine noise gradually diminishes when the utility vehicle 1 is decelerated and stopped. This results in a natural driving feeling.

Since the magnitude of the regenerative braking torque applied to the wheels 2 (3) is changed according to the vehicle states during the braking, effective energy recovery and a natural driving feeling are achieved.

In particular, in the present embodiment, during deceleration of the utility vehicle 1, the motor 20 (30) performs regenerative braking irrespective of the value of SOC of the battery unit 60 or the like, and a change in brake feeling due to a difference in the value of SOC will not occur. That is, a priority is given to the driver's feeling rather than protection of the battery unit 60. By setting the regenerative braking torque to about ¼ of the braking torque generated by the service brake 19 at most, the batteries are prevented from being changed excessively. Thus, there is no degradation of the batteries.

Note that the regenerative braking may be inhibited, for example, when the value of SOC is great, to prevent the battery unit 60 from being charged excessively. For example, during a state where the brake is OFF, the battery may be protected with a priority. In this case, if the value of SOC is not less than a predetermined value, the first regenerative braking torque is inhibited from being generated. On the other hand, during a state where the brake is ON, the motor 20 (30) may perform regenerative braking to generate the second regenerative braking torque irrespective of the value of SOC. In this case, the driver cannot enjoy an engine braking feeling, but a desired braking torque is attained by depressing the brake pedal 9.

For example, when the value of SOC is not less than a predetermined value and the brake is ON, the front motor 20 may perform regenerative braking, whereas the rear motor 30 may output the driving torque. By reducing the output torque of the rear motor 30, the driving torque of the rear wheels 3 can be cancelled by applying the service brake 19. Since a great regenerative braking torque can be attained at the front wheels 2 side where the ground load tends to increase, a desired braking force can be attained in the overall utility vehicle 1, and the battery unit 60 can be suppressed from being charged excessively.

—Other Embodiment—

The above embodiment is merely exemplary, and is in no way intended to limit the present invention, its applications and uses. Although the motor 20 (30) is switched between driving of the wheels 2 (3) and regenerative braking in response to ON/OFF of the accelerator pedal 8 in the present embodiment, the present invention is not limited to this. The motor 20 (30) may generate the driving torque when the displacement amount of the accelerator pedal 8 is not less than a reference displacement amount which is a degree to which the accelerator pedal 8 is depressed slightly, and may generate the braking torque by regenerative braking when the displacement amount of the accelerator pedal 8 is less than the reference displacement amount.

A rotational speed sensor may be provided to detect the rotational speed of each of the right and left front wheels 2 and the right and left rear wheels 3, and the vehicle speed of the utility vehicle 1 may be detected based on the output of the sensor.

Although the magnitude of the driving torque and the magnitude of the braking torque applied to the front and rear wheels 2 and 3 may be made different according to the vehicle states of the vehicle 1, the timing at which the torque is applied may be made different. For example, during a state where the brake is OFF, only one of the front and rear motors 20 and 30 (preferably front motor 20) may perform regenerative braking, and thereafter both of the front and rear motors 20 and 30 may perform regenerative braking, upon the brake being ON.

When both of the motors 20 and 30 perform regenerative braking, the magnitude of the braking torque of the front motor 20 may be set comparatively greater. Also, during a state where the brake is OFF, both of the front and rear motors 20 and 30 may perform regenerative braking, and thereafter only the front motor 20 may perform regenerative braking, upon the brake being ON.

In the utility vehicle 1 provided with the cargo bed 18 of a great size at the rear portion of the vehicle body 4, the ratio of allocation of the braking torque to the front wheels 2 and to the rear wheels 3 may be changed based on the presence/absence of luggage loaded on the cargo bed 18 or its weight. For example, the ratio of allocation of the braking torque to the rear wheels 3 may be increased as the weight of the luggage increase. The weight of luggage loaded on the cargo bed 18 may be calculated based on the output of a pneumatic sensor attached on the rear wheels 3.

In the case where balloon tires which dent easily are used as the front wheels 2 and the rear wheels 3 like the present embodiment, the ratio of allocation of the braking torque to the wheels which dent more may be set greater, in view of a change in a pneumatic pressure of those wheels or the influence of the luggage loaded on the cargo bed 18.

Although the four-wheel-drive utility vehicle 1 which drives the front wheels 2 and the rear wheels 3 has been described in the present embodiment, the utility vehicle 1 may be configured to drive either the front wheels 2 or the rear wheels 3. If one of the front motor 20 and the rear motor 30 or its control system fails, in the configuration in which the front wheels 20 and the rear wheels 3 are driven by the front motor 20 and the rear motor 30 respectively, like the present embodiment, the remaining one of the motors 20 and 30 can perform regenerative braking.

Although the utility vehicle 1 of the present embodiment accommodates the engine electric generator 70, the rear motor 30, the rear transaxle 31, the front motor driver 40, the rear motor driver 50, the S/G controller 80, and others, in the engine room provided in the rear portion of the vehicle body 4, the present invention is not limited to this. Alternatively, the motor drivers 40 and 50, and the S/G controller 80 may be accommodated in a region other than the engine room. In a further alternative, the engine room may be positioned at the front portion of the engine room.

Although in the present embodiment, the utility vehicle 1 (multi-purpose vehicle) has been described so far as an example of the electric vehicle, the electric vehicle may be an all terrain vehicle (ATV), a two-wheeled vehicle, or a three-wheeled vehicle. The electric vehicle is not limited to the series hybrid vehicle, but may be a parallel hybrid vehicle, a series-parallel hybrid vehicle, or an electric vehicle which is not equipped with an engine electric generator.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric vehicle comprising:
a motor for driving a wheel;
a hydraulic brake device for braking the wheel in response to a driver's operation of a brake operation member; and
a controller for controlling the motor in response to the driver's operation of an accelerator operation member;
wherein the controller includes:
a first motor control section for causing the motor to be placed in a regenerative braking mode to generate a first regenerative braking force, when a displacement amount of the accelerator operation member decreases to an amount less than a predetermined reference displacement amount; and
a second motor control section for causing the motor to generate a second regenerative braking force which is a sum of the first regenerative braking force and a predetermined additional braking force, in response to the operation of the brake operation member; and
the second motor control section is configured to decrease the second regenerative braking force according to a decrease in a vehicle speed of the electric vehicle.

2. The electric vehicle according to Claim 1,
wherein a ratio of a magnitude of the additional braking force with respect to a magnitude of the first regenerative braking force is substantially constant.

3. The electric vehicle according to Claim 1, further comprising:
a battery for storing electric power supplied to the motor; and
an engine electric generator including an engine and an electric generator, the electric generator being actuated by the engine and generating electric power; wherein
the electric generator of the engine electric generator is not mechanically coupled to the wheel and the electric generator provides the electric power to the battery;
the controller includes an engine electric generator controller for controlling the engine electric generator based on at least an SOC value of the battery; and
the engine electric generator controller is configured to cause the engine electric generator to stop power generation and to cause the engine to continue running, when the displacement amount of the accelerator operation member decreases to an amount which is not more than the predetermined reference displacement amount, in a state where the engine electric generator is activated.

4. The electric vehicle according to Claim 3,
wherein the engine electric generator controller is configured to gradually decrease an engine speed, after the displacement amount of the accelerator operation member decreases to an amount which is not more than the predetermined reference displacement amount.

5. The electric vehicle according to Claim 3,
wherein the second motor control section is configured to cause the motor to generate the second regenerative braking force, irrespective of the SOC value of the battery.

6. The electric vehicle according to Claim 1,
wherein the motor includes a front wheel motor for driving a front wheel, and a rear wheel motor for driving a rear wheel; and
the second motor control section is configured to allocate the additional braking force with a priority to a wheel which is at a forward side in a direction in which the electric vehicle moves.

7. The electric vehicle according to Claim 6,
wherein the second motor control section is configured to cause the additional braking force to be generated only in the motor corresponding to the wheel which is at the forward side in the direction in which the electric vehicle moves.

8. An electric vehicle comprising:
a motor for driving a wheel;
a hydraulic brake device for braking the wheel in response to a driver's operation of a brake operation member;
a battery for storing electric power supplied to the motor;
an engine electric generator including an engine and an electric generator; and
controller for controlling the motor in response to the driver's operation of an accelerator operation member, the controller including:
a first motor control section for causing the motor to be placed in a regenerative braking mode to generate a first regenerative braking force, when a displacement amount of the accelerator operation member decreases to an amount less than a predetermined reference displacement amount;

a second motor control section for causing the motor to generate a second regenerative braking force which is a sum of the first regenerative braking force and a predetermined additional braking force, in response to the operation of the brake operation member; and an engine electric generator controller for controlling the engine electric generator based on at least an SOC value of the battery;

wherein the engine electric generator controller is configured to cause the engine electric generator to stop power generation and to cause the engine to continue running, when the displacement amount of the accelerator operation member decrease to an amount which is not more than the predetermined reference displacement amount, in a state where the engine electric generator is activated, the engine electric generator controller is configured to gradually decrease an engine speed, after the displacement amount of the accelerator operation member decreased to an amount which is not more than the predetermined reference displacement amount, and wherein the engine electric generator controller is configured to decrease the engine speed, when a predetermined delay time passes, after the displacement amount of the accelerator operation member decreases to an amount which is not more than the predetermined reference displacement amount.

9. An electric vehicle comprising:
a motor for driving a wheel;
a battery for storing electric power supplied to the motor;
an engine electric generator including an engine and an electric generator;
a brake device for braking the wheel in response to a drive's operation of a brake operation member;
controller for controlling the motor in response to the driver's operation of an accelerator operation member, where in the controller further includes:
  a first motor control section for causing the motor to be placed in a regenerative braking mode to generate a first regenerative braking force, when a displacement amount of the accelerator operation member decreases to an amount less than a predetermined reference displacement amount;
  a second motor control section for causing the motor to generate a second regenerative braking force which is a sum of the first regenerative braking force and a predetermined additional braking force, in response to the operation of the brake operation member; and
  an engine electric generator control section for controlling the engine electric generator based on at least a SOC value of the battery; and
the engine electric generator control section is configured to decrease an engine speed, when a predetermined delay time passes, after the displacement amount of the accelerator operation member decreases to an amount which is not more than the predetermined reference displacement amount.

* * * * *